United States Patent
Liu et al.

(10) Patent No.: US 11,633,797 B2
(45) Date of Patent: Apr. 25, 2023

(54) BRAZE JOINTS FOR A COMPONENT AND METHODS OF FORMING THE SAME

(71) Applicant: General Electric Company, Schenectady, NY (US)

(72) Inventors: Shan Liu, Central, SC (US); Daniel J. Dorriety, Travelers Rest, SC (US); Paul A. Cook, Greenville, SC (US); Brian Leslie Henderson, Simpsonville, SC (US); Ryan T. Smith, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 118 days.

(21) Appl. No.: 16/685,548

(22) Filed: Nov. 15, 2019

(65) Prior Publication Data

US 2021/0146460 A1    May 20, 2021

(51) Int. Cl.
    *B23K 1/00*          (2006.01)
    *B23K 1/14*          (2006.01)
                 (Continued)

(52) U.S. Cl.
    CPC .............. *B23K 1/0018* (2013.01); *B23K 1/14* (2013.01); *B23K 35/0244* (2013.01);
                 (Continued)

(58) Field of Classification Search
CPC ............ B23K 1/0018; B23K 2101/001; B23K 35/0244; B23K 35/304; B23K 1/0008; B23K 1/015; B23K 1/19; B23K 20/021; B23K 2101/42; B23K 2103/26; B23K 26/123; B23K 26/144; B23K 26/21; B23K 26/34; B23K 35/025; B23K 35/3033; B23K 35/3046; B23K 9/0203; B23K 9/04; B23K 9/16; B23K 9/164; B23K 9/173
See application file for complete search history.

(56) References Cited

U.S. PATENT DOCUMENTS 5,535,812 A    7/1996   Singleton
5,542,596 A *   8/1996   Cimbak ................. B23K 1/015
                                                   228/234.2

(Continued)

FOREIGN PATENT DOCUMENTS

WO       2019164485 A1    8/2019
WO       2019168517 A1    9/2019

OTHER PUBLICATIONS

Extended European Search Report for Application EP20206552.0 dated May 6, 2021; 8 pp.

*Primary Examiner* — Erin B Saad
(74) *Attorney, Agent, or Firm* — Armstrong Teasdale LLP

(57) ABSTRACT

A system for creating a braze joint within a component. The system includes an environment operable to reach a braze temperature sufficient to melt at least a portion of a braze material. The system also includes a component within the environment, the component including a base having a base surface, a recess depending from the base surface into the base to an inner edge, and a braze material within the recess and forming a cap above the base surface. The braze material fills the recess from the cap to the inner edge. The cap has an exposed braze surface. The system also includes an insulation layer that at least partially covers the exposed braze surface.

9 Claims, 7 Drawing Sheets

(51) Int. Cl.
*B23K 35/02* (2006.01)
*B23K 101/00* (2006.01)
*B23K 35/30* (2006.01)

(52) U.S. Cl.
CPC ...... *B23K 35/3033* (2013.01); *B23K 35/3046* (2013.01); *B23K 2101/001* (2018.08)

(56) References Cited

U.S. PATENT DOCUMENTS

| | | |
|---|---|---|
| 7,259,350 B2 | 8/2007 | Minor et al. |
| 8,042,723 B2 * | 10/2011 | Holi ..................... B23P 6/002 228/141.1 |
| 9,149,881 B2 | 10/2015 | Ito et al. |
| 2012/0186254 A1 | 7/2012 | Ito et al. |
| 2016/0175998 A1 | 6/2016 | Ozbaysal |
| 2018/0200817 A1 | 7/2018 | Henderson et al. |

\* cited by examiner

BRAZE JOINTS FOR A COMPONENT AND METHODS OF FORMING THE SAME

BACKGROUND

The field of the disclosure relates generally to braze joints for metal alloys, and more specifically, to thermal control of a braze process.

For at least some known components fabricated in whole or in part from metal alloys, cracks or defects in the alloy may occur during normal use of the component. For example, at least some known rotary machines use stainless steels and nickel-base, cobalt-base, and iron-base superalloys in components used in the hot flow path of the rotary machine during operation. The hot flow path subjects the components to thermal and/or mechanical stresses and strains. Accordingly, when a crack or defect occurs in the alloys of these components, the repaired crack or defect must be able to similarly withstand the high temperatures, stresses, and strains of the hot flow path.

One known method of repairing a crack or defect in an alloy is to create a braze joint using a braze process. For some known nickel-based superalloys, such as Rene' N5, Rene' 108, CMSX-4®, and CMSX-6® (registered trademarks of Cannon Muskegon Corporation), use of a braze is the typical technique to salvage a damaged part. In a conventional braze process, a braze material is used to repair a defect in an existing component by filling the gap with the liquid or partially liquid braze material, then allowing the braze material to solidify. At least one known brazing method includes cleaning the defect surfaces to be joined, placing the component with the defect in a vacuum braze furnace, and heating the furnace to a target temperature so that the braze material becomes molten or partially molten, allowing the braze material to flow into the spaces that form the defect. The braze process may be used to fill a gap between two components to join them together or the braze material may be used to form a new component.

In at least some of the known braze processes for forming braze joints described above, as the braze material begins to cool after the braze material has filled the defect in the component, solidification shrinkage occurs within the joint. Additionally, in at least some known braze joints, as the braze material cools, the braze material closer to the surface of the metal alloy cools faster than the braze material deeper into the defect. This differential cooling, when combined with the solidification shrinkage, can induce solidification defects, such as braze joints with a high degree of porosity and/or hot cracking. In at least some known braze processes, porosities are likely to form when the gap filled with braze material is greater than 0.1 mm and the braze material is a blend of a superalloy powder and a braze filler of a much lower melting point. In at least some known braze processes, hot cracking is likely to occur when the gap filled with braze material is less than 0.1 mm and the braze material is pure braze filler. These defects in the braze joint can reduce tensile strength and shorten creep life and fatigue life of the braze joint, leading to increased wear on the alloy-containing component, which can cause a forced outage of a turbine or additional wear on other internal components. These issues associated with defects in the braze joint can be especially problematic for components designed to be used in high stress areas, such as within the hot flow path of a rotary engine.

BRIEF DESCRIPTION

In one aspect, a system for creating a braze joint is provided. The system includes an environment operable to reach a braze temperature sufficient to melt at least a portion of a braze material. The system also includes a component within the environment, the component including a base having a base surface, a recess depending from the base surface into the base to an inner edge, and a braze material within the recess and forming a cap above the base surface. The braze material fills the recess from the cap to the inner edge. The cap has an exposed braze surface. The system also includes an insulation layer that at least partially covers the exposed braze surface.

In another aspect, a method for brazing a recess defined within a base is provided. The recess depends from a surface of the base into the base to an inner edge. The method includes creating a cap of braze material above the recess. The cap has an exposed braze surface. The method further includes positioning a thermal insulation layer over the exposed braze surface. The method also includes heating the braze material within an environment to create at least partially molten braze material. The method further includes cooling the at least partially molten braze material to form a solid braze joint within the recess.

In another aspect, a method for brazing a recess defined within a base is provided. The recess depends from a base surface of the base into the base to an inner edge. The method includes supplying at least partially molten braze material from a cap into the recess to the inner edge. The method also includes extracting heat from a location on the base, the location being closer to the inner edge of the recess than to the cap.

DRAWINGS

These and other features, aspects, and advantages of the present disclosure will become better understood when the following detailed description is read with reference to the accompanying drawings in which like characters represent like parts throughout the drawings, wherein.

Figure 1:
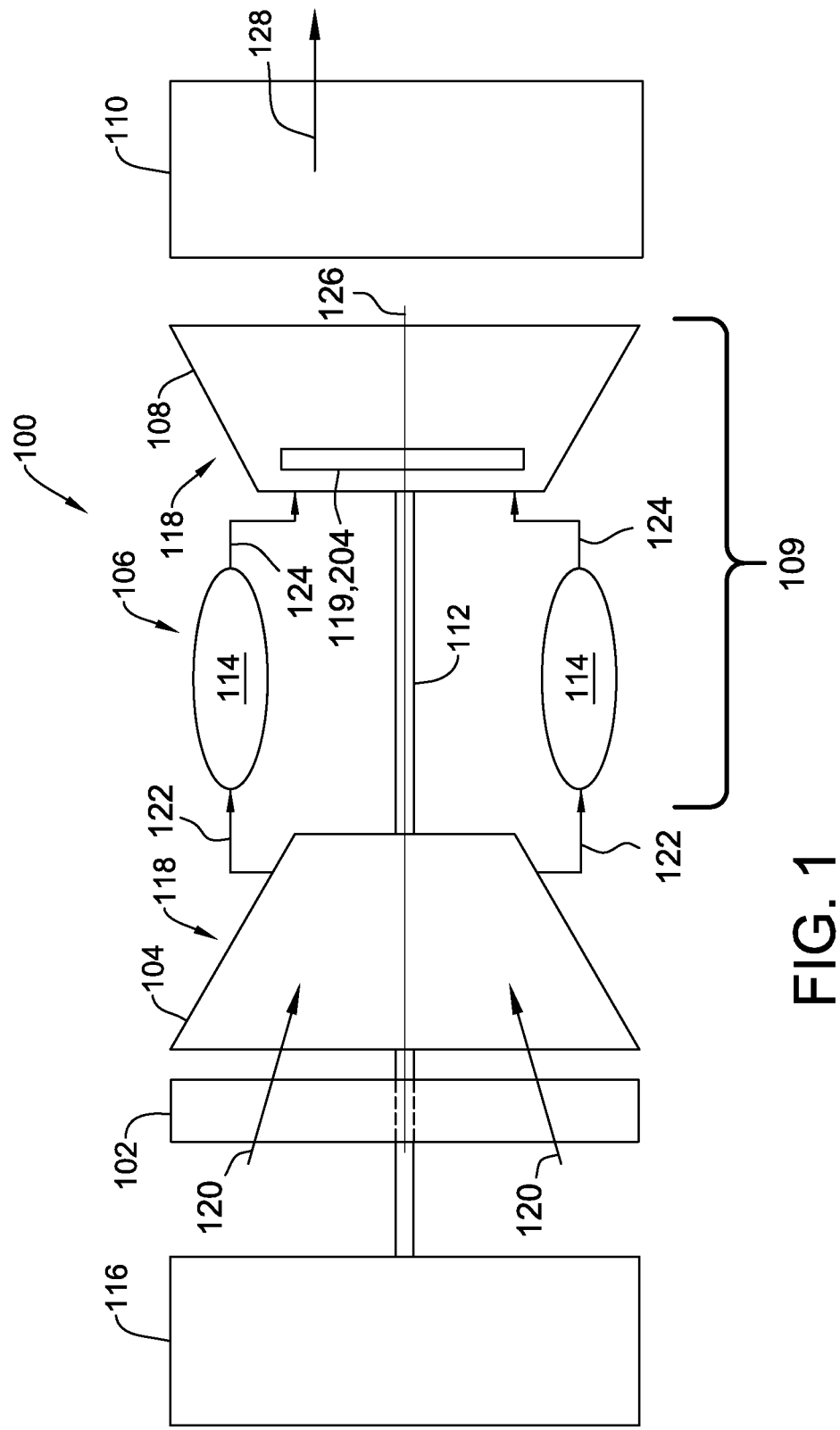
FIG. 1 is a schematic view of an exemplary rotary machine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

The systems and methods described herein relate to creating a braze joint within a component. Specifically, in an exemplary embodiment, the system includes an environment operable to reach a braze temperature sufficient to melt at least a portion of a braze material. The system also includes a component within the environment, the component including a base having a base surface, a recess depending from the base surface into the base to an inner edge, and a braze material within the recess and forming a cap above the base surface. The braze material fills the recess from the cap to the inner edge. The cap has an exposed braze surface. In some embodiments, the system also includes an insulation layer that at least partially covers the exposed braze surface of the cap. After the environment is heated to the brazing temperature, the system facilitates less rapid heat dissipation from the exposed braze surface of the cap, as compared to a system without the insulation layer. Additionally or alternatively, the system includes a cooling system operable to extract heat from the base at a location closer to the inner edge of the recess than to the cap, which facilitates more rapid cooling of the braze joint compared to the exposed braze surface of the cap. Accordingly, the system facilitates creating the braze joint having fewer or no solidification defects within the recess, relative to the cap extending above the base surface, during the braze process.

FIG. 1 is a schematic view of an exemplary rotary machine 100, i.e., a turbomachine, and more specifically a turbine engine. In the exemplary embodiment, rotary machine 100 is a gas turbine engine. Alternatively, rotary machine may be any other turbine engine and/or rotary machine, including, without limitation, a steam turbine engine, a gas turbofan aircraft engine, other aircraft engine, a wind turbine, a compressor, and a pump. In the exemplary embodiment, turbine engine 100 includes an intake section 102, a compressor section 104 that is coupled downstream from intake section 102, a combustor section 106 that is coupled downstream from compressor section 104, a turbine section 108 that is coupled downstream from combustor section 106, and an exhaust section 110 that is coupled downstream from turbine section 108. Turbine section 108 is coupled to compressor section 104 via a rotor shaft 112. It should be noted that, as used herein, the term "couple" is not limited to a direct mechanical, thermal, electrical, and/or flow communication connection between components, but may also include an indirect mechanical, thermal, electrical, and/or flow communication connection between multiple components. In the exemplary embodiment, combustor section 106 includes a plurality of combustors 114. Combustor section 106 is coupled to compressor section 104 such that each combustor 114 is in flow communication with the compressor section 104. Rotor shaft 112 is further coupled to a load 116 such as, but not limited to, an electrical generator and/or a mechanical drive application. In the exemplary embodiment, each of compressor section 104 and turbine section 108 includes at least one rotor assembly 118 that is coupled to rotor shaft 112. Each rotor assembly 118 of turbine section 108 includes a plurality of circumferentially arranged, radially extending turbine blades 119.

In operation, intake section 102 channels air 120 towards compressor section 104. Compressor section 104 compresses inlet air 120 to higher pressures prior to discharging compressed air 122 towards combustor section 106. Compressed air 122 is channeled to combustor section 106 where it is mixed with fuel (not shown) and burned to generate high temperature combustion gases 124. Combustion gases 124 are channeled downstream towards turbine section 108 and impinge upon turbine blades 119, converting thermal energy to mechanical rotational energy that is used to drive rotor assembly 118 about a longitudinal axis 126. Often, combustor section 106 and turbine section 108 are referred to as a hot gas section 109 of turbine engine 100. Exhaust gases 128 then discharge through exhaust section 110 to ambient atmosphere.

In some embodiments, during operation of turbine engine 100, components 204 of hot gas section 109, such as but not limited to turbine blades 119, which may include stator vanes (not shown) and shrouds (not shown), can be exposed to temperatures as high as, for example, 1250 degrees Celsius, creating heat stresses. In turbine section 108, components 204 are also subjected to mechanical stresses during operation, such as stresses from high speed rotation and the push of high-speed hot gases from combustor 106. Such extreme operating conditions can cause cracks due to creep and/or fatigue and other defects to form within components 204 of hot gas section 109, requiring repair.

Figure 2:
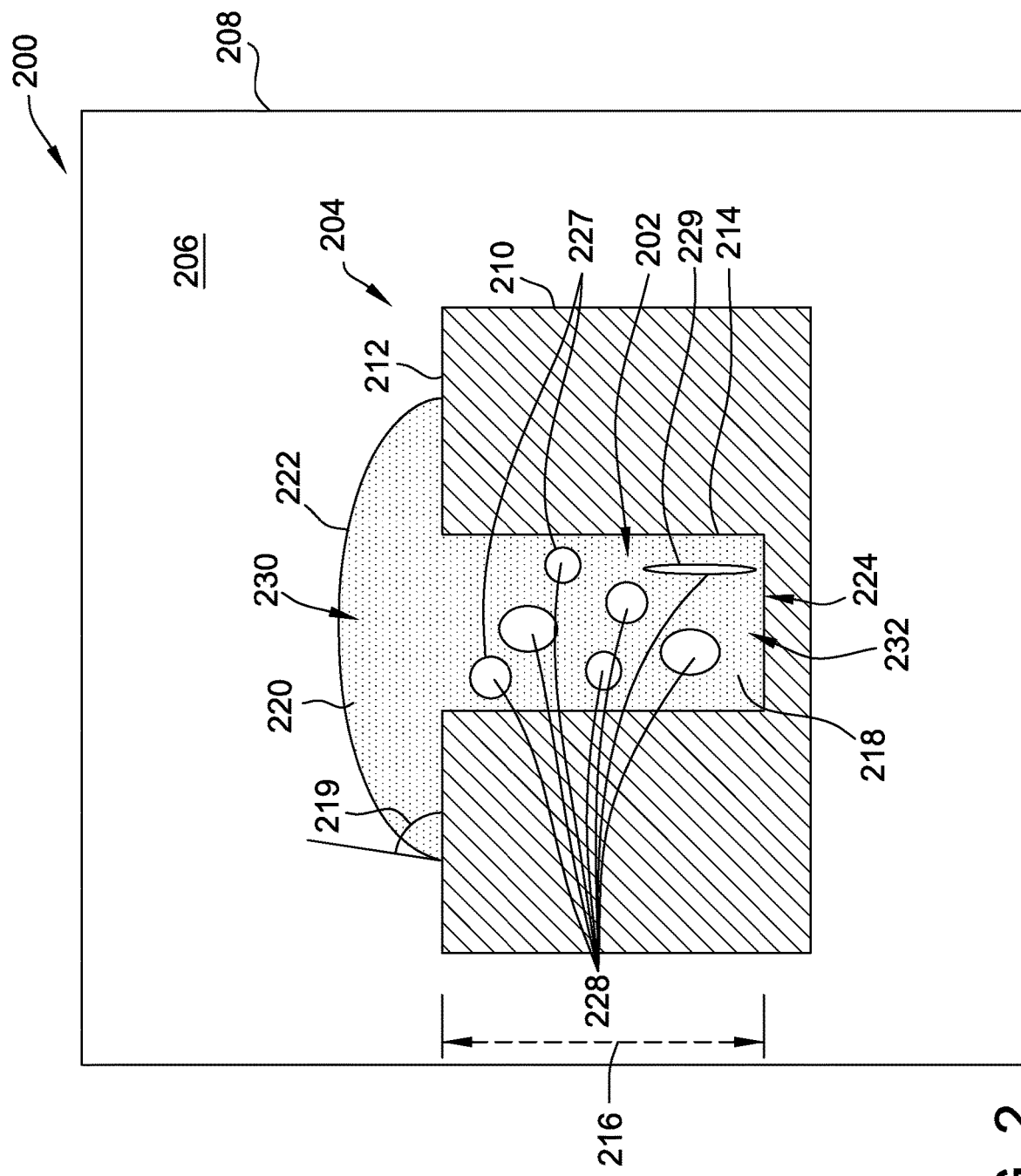
FIG. 2 is a cross-sectional view of an exemplary system for creating a braze joint within a component.

FIG. 2 is a cross-sectional view of a system 200 for creating a braze joint 202 within one or more of components 204. Although component 204 is described as a component of rotary machine 100 for purposes of illustration, it should be understood that system 200 is also contemplated for creating a braze joint in any suitable component 204 in a wide variety of applications, and is not limited to use with components of rotary machine 100 described herein.

In some embodiments, component 204 is formed from a metal alloy used within the hot gas section 109 or the combustor 106 of turbine engine 100. In some such embodiments, component 204 is fabricated from a cobalt-base or a nickel-base superalloy. For example, component 204 may be fabricated from a single crystalline nickel-based superalloy, such as CMSX-4®. In alternative embodiments, component 204 is formed from any alloy that can be brazed using the systems and methods described herein.

System 200 includes an environment 206 for creating braze joint 202. In some embodiments, environment 206 is a cavity defined within a heating compartment 208. In the exemplary embodiment, heating compartment 208 is a vacuum furnace configured to supply both heat and vacuum to the cavity during the brazing process. For example, heating compartment 208 is configured to supply uniform temperatures across environment 206, and to pull sufficient vacuum within environment 206 to remove at least some gases present in environment 206. In an embodiment, such gases include oxygen, nitrogen, carbon dioxide, water vapor, and methane. In alternative embodiments, environment 206 is any suitable environment that allows the braze joint to be formed within component 204 as described herein.

Component 204 includes a base 210 having a base surface 212 and a recess 214 depending inwardly a recess depth 216 from base surface 212 to an inner edge 224. In the exemplary embodiment, recess 214 represents a defect, such as a crack, in base 210 that may occur during normal use of component 204. Inner edge 224 represents the innermost or deepest extent of the crack from base surface 212. For example, in embodiments where component 204 is formed from a metal alloy used within the hot gas section 109 of turbine engine 100, recess 214 may be formed due to the combination of rotational stress, force from rapidly flowing hot gas stream and/or cyclic thermomechanical strain on component 204. In alternative embodiments, recess 214 may have been formed by another process, such as, intentionally or unintentionally during a casting or machining process for component 204 or a joint bonding two separately-formed components 204 together.

Braze joint 202 is formed from a braze material 218. In one embodiment, braze material 218 includes a pure braze filler alloy, such as DF-4B diffusion braze alloy. The braze filler alloy may include one or more of aluminum, silicon, copper, silver, germanium, gold, nickel, cobalt and boron. In the exemplary embodiment, the braze alloy is a multi-component eutectic with relatively low melting point compared to the component 204. For example, braze alloys used for components 204 formed from cobalt-base and nickel-base superalloys typically have a melting temperature less than 1120 degrees Celsius, and, more specifically, between 900 and 1100 degrees Celsius. In another embodiment, braze material 218 includes a blend of a braze powder and a braze filler alloy. The braze powder is typically a superalloy for component 204 and has a higher strength and a higher melting point compared to the braze filler alloy. As such, at certain temperatures, the braze alloy is molten while the braze powder is solid, creating a partially molten braze material 218. In alternative embodiments, the braze material 218 may consist entirely or substantially of a braze filler alloy, or may comprise other material that allows the brazing joint 202 to form as described herein.

In an embodiment, braze material 218 comprises a braze filler alloy and a braze powder that are mixed with a binder to create a braze paste. For example, but not by way of limitation, the braze filler alloy and the braze powder are mixed with eight percent binder. The braze paste is semi-solid, which, in some embodiments, allows braze material 218 to be poured or injected into recess 214. Such filling techniques are particularly suited for recesses 214 wider than 0.1 millimeter. In alternative embodiments, braze paste or pure braze filler alloy may be placed above recess 214 to create a cap 220 and braze material 218 is allowed to flow into recess by capillary effect. Such a filling technique is particularly suited for recesses 214 equal to or narrower than 0.1 millimeter.

In some embodiments, during the brazing process, environment 206 is heated to a brazing temperature. In some embodiments, the environment 206 is held at the brazing temperature for 10 minutes to 120 minutes. In some such embodiments, environment 206 is held at the brazing temperature for 20 minutes to 40 minutes, and in some such embodiments, for 30 minutes. Alternatively, environment 206 is kept at brazing temperature for any suitable length of time. The brazing temperature is lower than the melting temperature of component 204 and high enough to cause braze material 218 to become molten, or partially molten, as described above. In the exemplary embodiment, in which braze material 218 comprises a braze paste, at the brazing temperature, the braze alloy melts while the braze powder remains solid, creating a partially-molten braze material 218. In some such embodiments, before environment 206 is heated to the brazing temperature, solid or paste braze material 218 is placed into recess 214 to fill recess from inner edge 224 to base surface 212. In some such embodiments, additional braze material 218 is placed above base surface 212 to create cap 220. Cap 220 is in fluid communication with braze material 218 in recess 214. Braze material 218 is then heated to the brazing temperature, burning off most or all of any binder present and causing braze material 218 to become at least partially molten.

As described above, in alternative embodiments, braze paste or pure braze alloy may be placed above recess 214 to create a cap 220 and braze material 218 is allowed to flow into recess 214 by capillary effect. The loading of recess 214 may occur at room temperature or may occur by heating environment 206 to a brazing temperature. In an exemplary embodiment, braze material 218 is heated to the brazing temperature, creating an exposed braze surface 222 on at least partially-molten cap 220 and a contact angle 219 between the partially-molten braze material 218 and recess 214. In some such embodiments, pure braze filler wets base surface 212, inner edge 224 and the other surfaces of recess 214 and creates contact angle 219 of less than 90 degrees. In further embodiments, contact angle 219 is less than or equal to 30 degrees, allowing the braze material to spread over the inner edge 224 and other surfaces of recess 214 and drawing braze material 218 into recess 214 by capillary effect. In alternative embodiments, braze material 218 is completely melted at the braze temperature. In alternative or additional embodiments, braze material 218 is placed on base surface 212 over recess 214 in its partially-molten state, and is allowed to feed the recess 214 by capillary effect. In further embodiments, the braze material 218 may fill only a portion of recess 214 such that cap 220 is drawn into recess 214 once the braze material is heated to braze temperature in environment 206.

In some embodiments, after braze material 218 reaches the brazing temperature, becomes at least partially molten, and fully fills the recess, the temperature in environment 206 is lowered and braze material 218 is allowed to cool to solidify braze material 218, creating braze joint 202 within recess 214. In some embodiments, solidification of braze material 218 causes braze material 218 to shrink, which can lead to solidification defects 228 in braze joint 202. Some such solidification defects 228 include a high porosity (both in quantity and size) in the solid braze joint 202, as illustrated by pores 227 in FIG. 2. Other solidification defects 228 include linear indications, or cracks, as illustrated by linear indication 229. In some embodiments, as base 210 and braze material 218 begin cool, a first portion 230 of braze material 218 located at or near exposed braze surface 222 decreases in temperature more rapidly than a second portion 232 of braze material 218 located at or near inner edge 224. When one portion of braze material 218 cools faster than another portion, such as first portion 230 cooling faster in environment 206 than second portion 232, the solidification shrinkage can cause defects 228 to form. In this exemplary embodiment, by first portion 230 cooling faster than second portion 232, solidification defects 228 form within solidified braze material 218 near second portion 232. When component 204 including braze joint 202 is returned to service, at least some such known solidification defects 228 result in reduced tensile strength and a shorter creep life and fatigue life of the braze joint 202.

In some embodiments, the size of cap 220 compared to the size of braze joint 202 can affect an ability of cap 220 to feed shrinkage of braze material 218 within recess 214 during cooling. In some such embodiments, a ratio of modulus of cap 220 to the modulus of braze joint 202 can be used to characterize how effectively cap 220 feeds braze joint 202, where modulus is defined as volume of a geometrical body divided by the heat dissipation area of the geometrical body. For example, if the modulus ratio is less than 1.0, braze material 218 in cap 220 starts and completes solidification earlier than braze material 218 in recess 214 while cooling in environment 206. In one embodiment, a ratio of the modulus of cap 220 to the modulus of braze joint 202 greater than 1.0 effectively feeds braze material 218 into recess 214 to at least partially compensate for shrinkage during cooling. In some embodiments, a ratio of the modulus of cap 220 to the modulus of braze joint 202 greater than 1.1 effectively feeds braze material 218 into recess 214 during cooling to at least partially compensate for shrinkage and decrease solidification defects 228. In further embodiments, a ratio of the modulus of cap 220 to the modulus of braze joint 202 greater than 1.5 particularly effectively feeds braze material 218 into recess 214 during cooling to at least partially compensate for shrinkage and decrease solidification defects 228. In alternative embodiments, a ratio of the modulus of cap 220 to the modulus of braze joint 202 greater than 1.5 feeds braze material 218 into recess 214 during cooling to completely compensate for shrinkage and eliminate solidification defects 228 in braze joint 202. Additionally or alternatively, increasing contact angle 219 at base surface 212 effectively increases the modulus of cap 220, increasing feeding of braze material 218 from cap 220 to recess 214 during cooling to at least partially compensate for shrinkage. In various embodiments, the size of cap 220 and contact angle 219 are varied to increase feeding capability of cap 220 into recess 214 during cooling.

Figure 3:
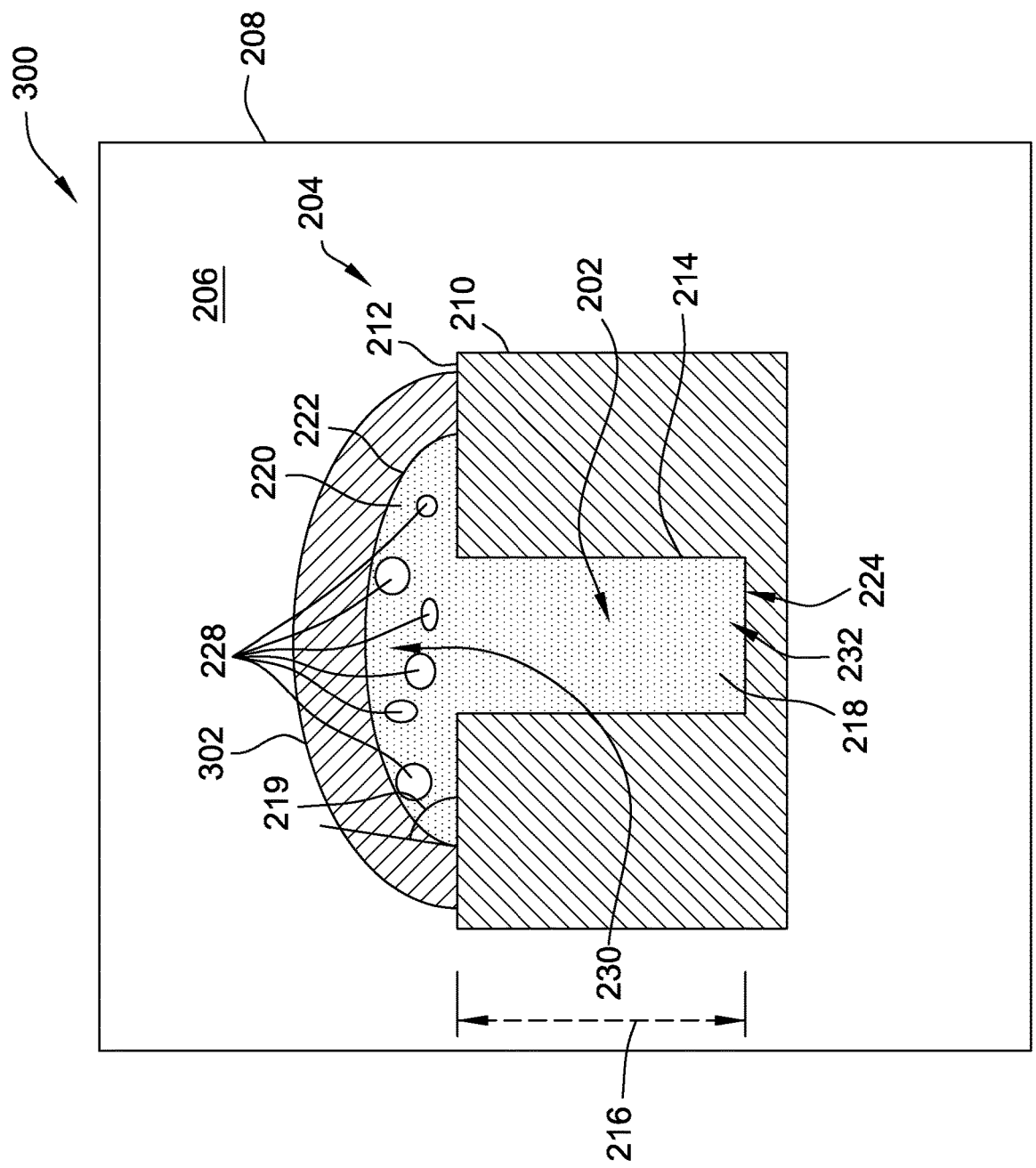
FIG. 3 is a cross-sectional view of another exemplary system for creating a braze joint within a component.

FIG. 3 is a cross-sectional view of another exemplary embodiment of a system for creating braze joint 202 within component 204, designated system 300. System 300 is similar to system 200, and, accordingly, like components are labeled the same as for system 200. System 300 differs from system 200 in that system 300 includes a thermal insulation layer 302 that at least partially covers exposed braze surface 222 of cap 220 of braze material 218. In the exemplary embodiment, thermal insulation layer 302 completely covers cap 220 and a portion of base surface 212. Like system 200, in system 300 braze joint 202 is created by heating braze material 218 to a brazing temperature, causing braze material 218 to become at least partially molten and allowing braze material 218 to enter recess 214. In some embodiments of system 300, before heating braze material 218 to the brazing temperature, or after braze material 218 is made at least partially molten, thermal insulation layer 302 is placed over exposed braze surface 222 such that thermal insulation layer 302 at least partially covers exposed braze surface 222.

Thermal insulation layer 302 may include any material that allows the thermal insulation layer 302 to function as described herein. In some embodiments, the thermal insulation layer 302 is formed from one or more of ceramic material, ceramic fiber, mineral wool, polycrystalline fiber, silica cloth, and any combinations thereof.

Similar to system 200, in the exemplary embodiment of system 300, once component 204 has been heated in environment 206 for sufficient time to create at least partially molten braze material 218, environment 206 is allowed to cool from the brazing temperature. As environment 206 cools, base 210 and braze material 218 also begin to cool, allowing braze material 218 to solidify forming braze joint 202. Unlike system 200, in some embodiments, thermal insulation layer 302 causes first portion 230, located near cap 220 and braze surface 222, to cool more slowly than second portion 232, located near inner edge 224. Because of the temperature differential between first portion 230 and second portion 232, solidification of braze material 218 starts and completes earlier near second portion 232 than first portion 230. Accordingly, as shrinkage occurs in braze material 218 during solidification, any solidification defects 228 that form in braze material 218 occur closer to first portion 230 than to second portion 232. More specifically, in the exemplary embodiment, thermal insulation layer 302 causes solidification defects 228 to primarily form in cap 220 near exposed braze surface 222. Before component 204 is returned to service, cap 220 is removed or is otherwise not designed to contribute to a strength of braze joint 202. Accordingly, in some embodiments, solidification defects 228 in first portion 230 of braze material 218 do not significantly affect a performance of braze joint 202.

Like with system 200, in system 300, varying the size of cap 220 compared to the size of braze joint 202, in combination with applying thermal insulation layer 302, can affect the ability of cap 220 to feed braze material 218 into recess 214 to at least partially compensate for shrinkage during cooling. In some such embodiments, the ratio of modulus of cap 220 to the modulus of braze joint 202 can be used to characterize how effectively cap 220 feeds braze joint 202. In some further embodiments, thermal insulation layer 302 increases the modulus of cap 220, and thus its ratio to the modulus of braze joint 202, when compared to the corresponding ratio for caps 220 without an insulation layer, such as the cap 220 illustrated in system 200. In some such embodiments, thermal insulation layer 302 allows for cap 220 having a smaller width to provide the same amount of feeding of braze joint 202 as cap 220 having a larger width but without an insulation layer.

Figure 4:
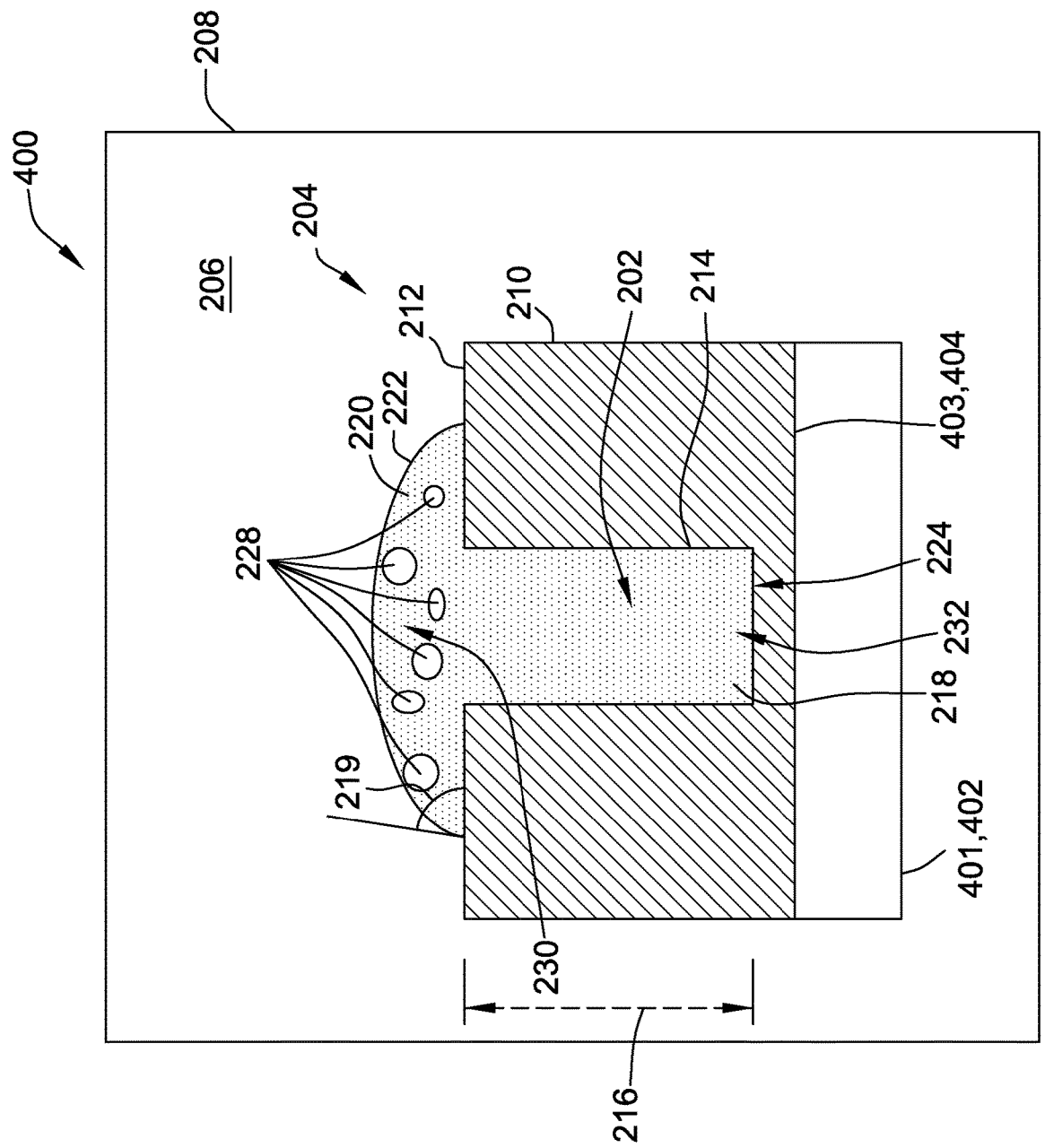
FIG. 4 is a cross-sectional view of another exemplary system for creating a braze joint within a component.

FIG. 4 is a cross-sectional view of another exemplary embodiment of a system for creating braze joint 202 within component 204, designated system 400. System 400 is similar to system 200, and accordingly, like components are labeled the same as system 200. System 400 differs from system 200 in that system 400 includes a cooling device 401 operable to extract heat from a location 403 on base 210. More specifically, location 403 is closer to inner edge 224 of recess 214 than to cap 220.

In the exemplary embodiment, cooling device 401 includes a thermal conduction element 402 in contact with location 403. Also in the exemplary embodiment, location 403 is a second base surface 404 of base 210 located opposite base surface 212. However, it will be appreciated that location 403 may be any location that is closer to inner edge 224 of recess 214 than to cap 220. In other words, location 403 is selected such that cooling device 401 enhances the heat extraction of second portion 232 of braze material 218 while having less effect on first portion 230 of braze material 218.

Similar to system 200, in the exemplary embodiment of system 400, after component 204 has been heated in environment 206 for sufficient time to create at least partially molten braze material 218, environment 206 is allowed to cool from the brazing temperature. In the exemplary embodiment, thermal conduction element 402 is configured to extract heat from location 403 of base 210 while environment 206 is cooling. In alternative embodiments, thermal conduction element 402 is configured to extract heat from location 403 of base 210 while environment 206 is actively heating environment 206 and then while environment 206 is cooling. Because thermal conduction element 402 is located closer to second portion 232 than to first portion 230, braze material 218 reduces in temperature faster near second portion 232 than first portion 230. Because of the temperature differential between first portion 230 and second portion 232, solidification of braze material 218 occurs more rapidly near second portion 232 than first portion 230. Accordingly, as shrinkage occurs in braze material 218 during solidification, solidification defects 228 that form in braze material 218 occur closer to first portion 230 than to second portion 232. In the exemplary embodiment, solidification defects 228 primarily form in cap 220 near exposed braze surface 222. Before component 204 is returned to service, cap 220 is removed or is otherwise not designed to contribute to a strength of braze joint 202. Accordingly, solidification defects 228 in first portion 230 of braze material 218 do not significantly affect a performance of braze joint 202.

Thermal conduction element 402 includes any thermal conductive material and/or system that allows thermal conduction element to function as described herein. In some embodiments, thermal conduction element 402 includes a heat exchanger. Thermal conduction element 402 may be, for example, a plate-fin heat exchanger, a plate heat exchanger, or a tube heat exchanger. In still further embodiments, thermal conductive element 402 includes a graphite plate with embedded cooling channels connected to a cooling media. In alternative embodiments, cooling device 401 includes any suitable structure that enables system 400 to function as described herein.

Figure 5:
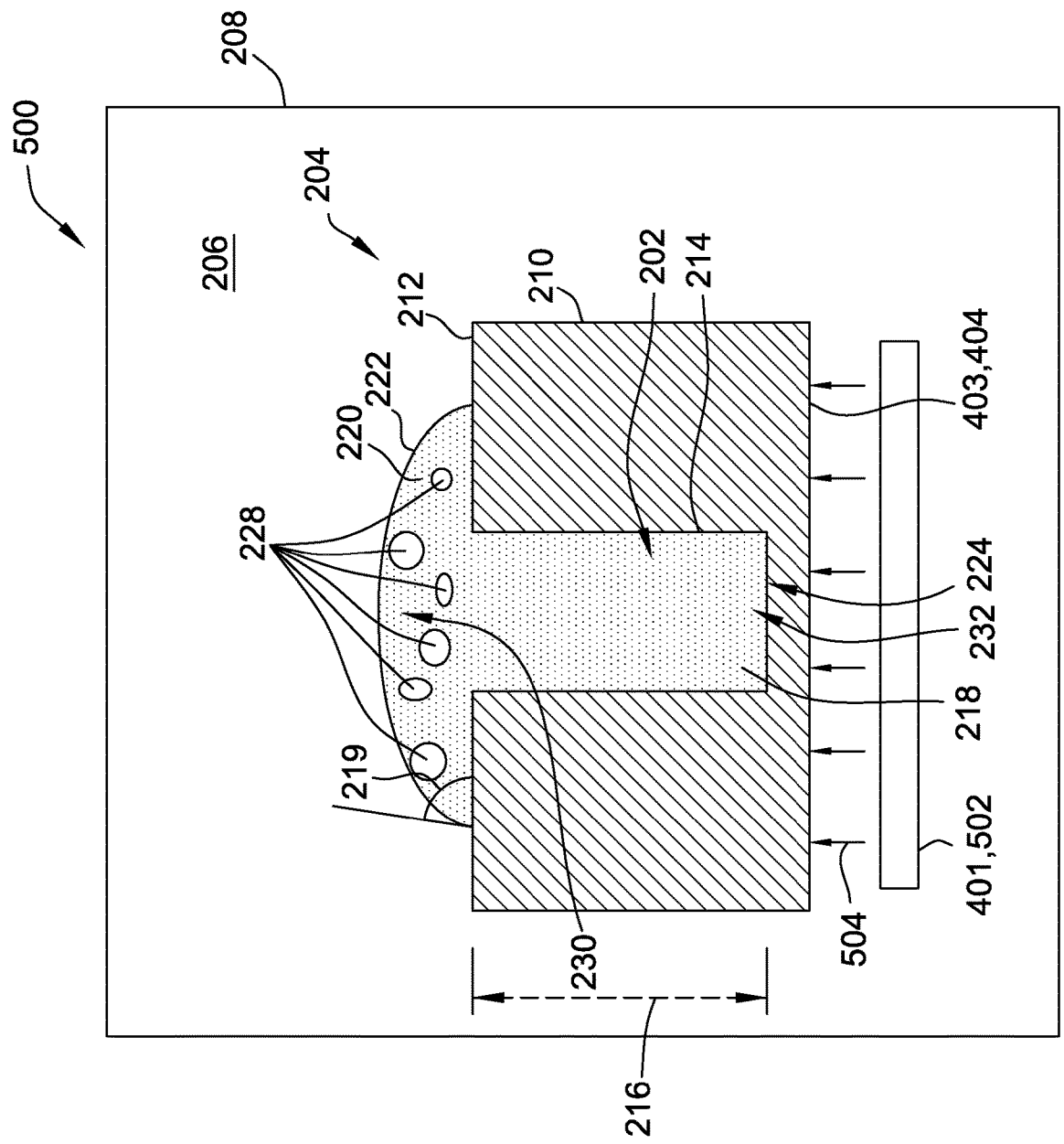
FIG. 5 is a cross-sectional view of another exemplary system for creating a braze joint within a component.

FIG. 5 is a cross-sectional view of another exemplary system for creating braze joint 202 within component 204, designated system 500. System 500 is similar to system 400, and accordingly, like components are labeled the same as system 400. System 500 differs from system 400 in that cooling device 401 is implemented as an impingement manifold 502 configured to direct a fluid 504 into impingement with base 210 at location 403. As above, location 403 is selected such that fluid 504 impinges a portion of base 210 closer to inner edge 224 of recess 214, and second portion 232, than to cap 220, exposed braze surface 222, and first portion 230. In the illustrated embodiment, location 403 is again second base surface 404 of base 210 located opposite base surface 212. Alternatively, location 403 may be any location that is closer to inner edge 224 of recess 214 than to cap 220.

Similar to system 200, in the exemplary embodiment of system 500, after component 204 has been heated in environment 206 for sufficient time to create at least partially molten braze material 218, environment 206 is allowed to cool from the brazing temperature. Impingement manifold 502 is configured to direct fluid 504 to extract heat from location 403 of base 210 while environment 206 is cooling. Because fluid 504 impinges on base 210 at location 403 closer to second portion 232 than to first portion 230, braze material 218 reduces in temperature faster near second portion 232 than first portion 230. Because of the temperature differential between first portion 230 and second portion 232, solidification of braze material 218 occurs more rapidly near second portion 232 than first portion 230. Accordingly, as shrinkage occurs in braze material 218 during solidification, solidification defects 228 that form in braze material 218 occur closer to first portion 230 than to second portion 232. In the exemplary embodiment, solidification defects 228 primarily form in cap 220 near exposed braze surface 222. Before component 204 is returned to service, cap 220 is removed or is otherwise not designed to contribute to a strength of braze joint 202. Accordingly, solidification defects 228 in first portion 230 of braze material 218 do not significantly affect a performance of braze joint 202.

Impingement manifold 502, and fluid 504 directed thereby, includes any thermal convective system and/or process that allows the cooling device 401 to function as described herein. In some embodiments, impingement manifold 502 comprises jet nozzles connected to a source of fluid 504 such as a pressurized gas. In some such embodiments, fluid 504 includes one or more of argon, helium, hydrogen, and/or nitrogen.

Although insulation layer 302 (shown in FIG. 3) and cooling device 401 (shown in FIGS. 4 and 5) are illustrated above as being implemented separately, in some embodiments additional advantages in reducing or eliminating solidification defects 228 from braze joint 202 are obtained by implementing insulation layer 302 and cooling device 401 concurrently. In other words, during the cool-down phase after environment 206 is heated to the brazing temperature, insulation layer 302 at least partially covers exposed braze surface 222 of cap 220 concurrently with cooling device 401 (e.g., thermal conduction element 402 or impingement manifold 502) operating to extract heat from location 403 of base 210, further facilitating more rapid solidification of braze material 218 near second portion 232 than first portion 230.

Figure 6:
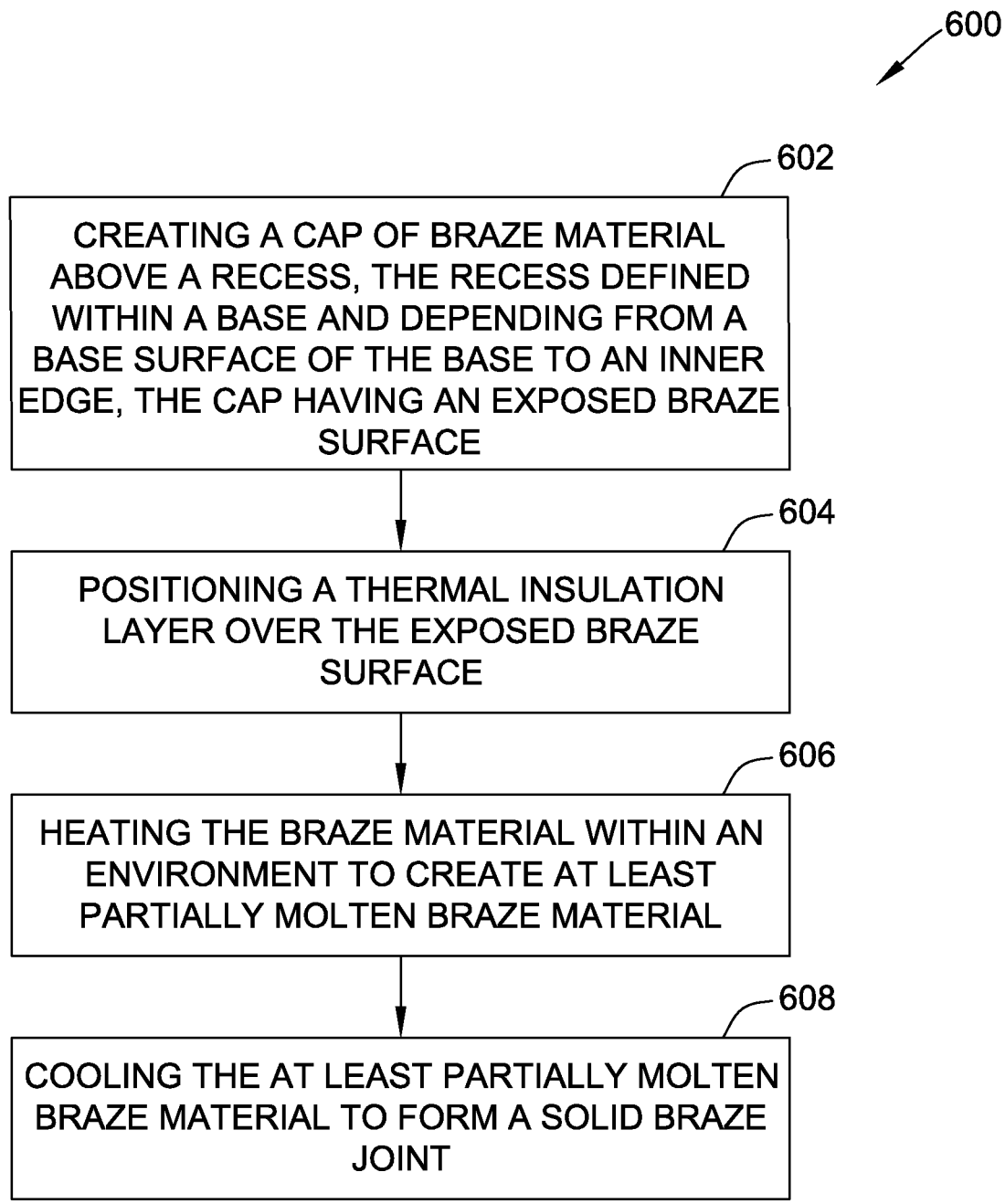
FIG. 6 is a flow diagram of an exemplary method of creating a braze joint.

FIG. 6 is a flow diagram of an exemplary method 600 of brazing a recess defined within a base, such as brazing recess 214 defined within base 210 (shown in FIGS. 2-5). The recess depends from a base surface, such as base surface 212, into the base to an inner edge, such as inner edge 224. Method 600 includes creating 602 a cap, such as cap 220, of braze material, such as braze material 218, above the recess. The cap has an exposed braze surface, such as exposed braze surface 222. Method 600 further includes positioning 604 a thermal insulation layer, such as thermal insulation layer 302, over the exposed braze surface. Method 600 further includes heating 606 the braze material within an environment, such as environment 206, to create at least partially molten braze material. Method 600 further includes cooling 608 the at least partially molten braze material to form a solid braze joint, such as braze joint 202.

In some embodiments in which the braze material is a braze paste comprising a braze filler alloy, a braze powder, and a binder, creating 602 a cap of braze material above the recess further includes filling the recess from the surface to the inner edge with the braze paste such that the cap and braze paste in the recess are in fluid communication. In further embodiments, heating 606 the braze material within an environment to create at least partially molten braze material further includes filling the recess to the inner edge with at least partially molten braze material from the cap via capillary effect. In certain embodiments, cooling 608 the at least partially molten braze material to form the braze joint further comprises passively allowing the environment to cool.

In some embodiments, cooling 608 the at least partially molten braze material includes cooling a location on the base closer to the inner edge than to the cap. In particular embodiments, cooling 608 the at least partially molten braze material further includes solidifying the cap. In some such embodiments, the solid cap has greater porosity than the solid braze joint.

Figure 7:
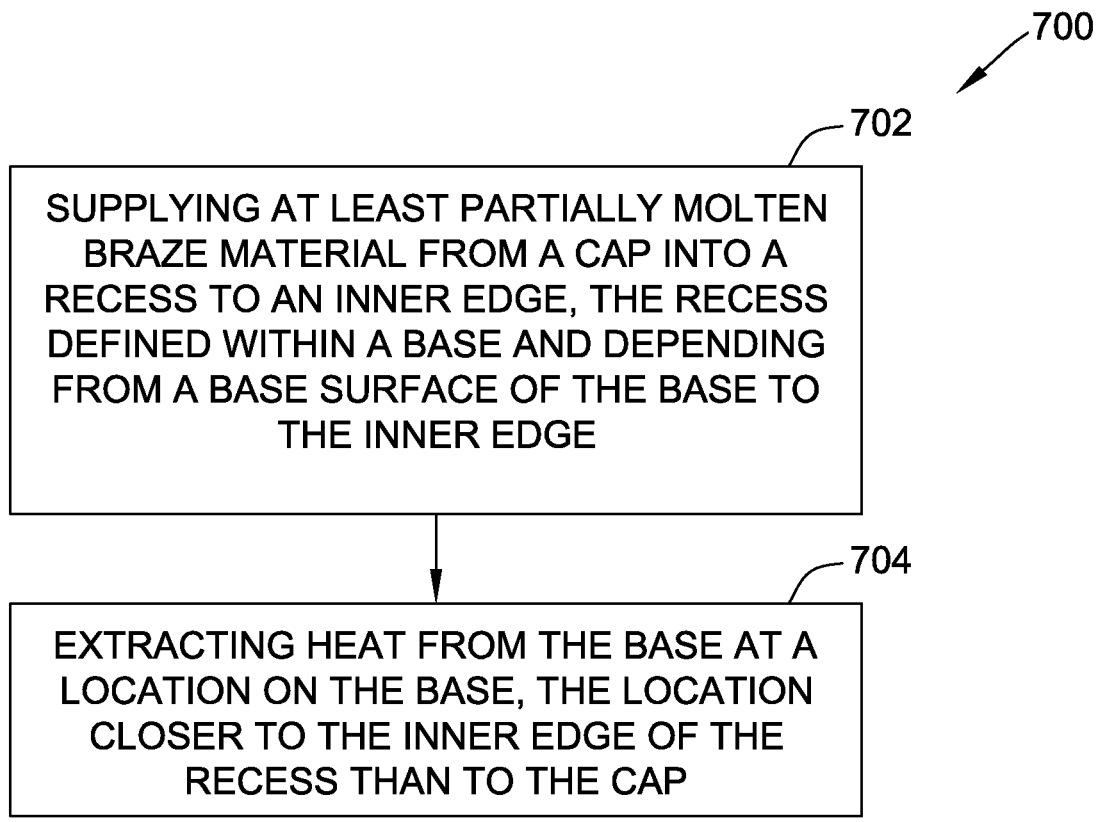
FIG. 7 is a flow diagram of another exemplary method of creating a braze joint.

FIG. 7 is a flow diagram of another exemplary method 700 of brazing a recess defined within a base, such as brazing recess 214 within base 210 (shown in FIGS. 2-5). The recess depends from a base surface, such as base surface 212, into the base to an inner edge, such as inner edge 224. Method 700 includes supplying 702 at least partially molten braze material, such as braze material 218, from a cap, such as cap 220, into the recess to the inner edge. Method 700 also includes extracting heat 704 from the base at a location on the base, the location situated closer to the inner edge of the base than to the base surface.

In some embodiments, extracting heat 704 from the base includes conductive cooling at the location using a heat exchanger. In other embodiments, extracting heat 704 from the base includes convective cooling at the location using impingement cooling.

In some embodiments, method 700 further includes positioning at least partially solid braze material above the recess within a environment, such as environment 206. In some such embodiments, supplying 602 the at least partially molten braze material from the cap to the recess further includes heating the environment to a brazing temperature to create the at least partially molten braze material.

In particular embodiments, method 700 further includes positioning a thermal insulation layer, such as thermal insulation layer 302, over an exposed braze surface, such as exposed braze surface 222, on the cap before supplying the at least partially molten braze material and extracting heat from the base.

The above systems and methods for creating a braze joint within a component facilitates creating braze joints within a component having less or no defects formed within the joint during the braze process, thus decreasing the need to replace the braze joint and increasing the longevity of a component with the braze joint. The systems and methods produce a high degree of metallurgical integrity, which imparts superior and reliable mechanical capabilities to the braze joint. The systems and methods may be particularly advantageous for components used in extreme heat and high-mechanical stress environments, such as components subjected to the high temperatures and rotational stress in the hot gas section of gas turbines.

Additionally, an exemplary technical effect of the systems and methods described herein includes at least one of: (a) reducing defects within a braze joint due to solidification shrinkage; (b) reducing the amount of braze material needed to feed a recess when forming a braze joint in a component; and (c) increase the life of the braze joint.

Exemplary embodiments of systems and methods for brazing a joint within a component are described above in detail. The methods and systems are not limited to the specific embodiments described herein, but rather, components of systems and/or steps of the methods may be utilized independently and separately from other components and/or steps described herein. For example, the systems and methods may also be used in combination with many types of components, and are not limited to practice only with the gas turbine engine as described herein. Rather, the exemplary embodiment can be implemented and utilized in connection with many other joint-brazing applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of brazing a recess defined within a base, the recess depending from a base surface of the base into the base to an inner edge, the method comprising:
    creating a cap of braze material above the recess, the cap having an exposed braze surface;
    positioning a thermal insulation layer over the exposed braze surface;
    heating the braze material within an environment to create at least partially molten braze material that includes a first portion adjacent to the cap, and a second portion adjacent to the inner edge; and
    cooling the at least partially molten braze material to form a solid braze joint within the recess, wherein cooling the at least partially molten braze material comprises selectively extracting heat from a location on the base, the location being closer to the inner edge of the recess than to the cap, such that heat extraction at the location is greater than heat extraction at the cap.

2. The method in accordance with claim 1, wherein the braze material is a braze paste comprising a braze filler alloy, a braze powder, and a binder, and wherein creating a cap of braze material above the recess further comprises filling the recess from the surface to the inner edge with the braze paste such that the cap and braze paste in the recess are in fluid communication.

3. The method in accordance with claim 1, wherein heating the braze material within an environment to create at least partially molten braze material further comprises filling the recess to the inner edge with at least partially molten braze material from the cap via capillary effect.

4. The method in accordance with claim 1, wherein cooling the at least partially molten braze material to form a braze joint further comprises passively allowing the environment to cool.

5. A method of brazing a recess defined within a base, the recess depending from a base surface of the base into the base to an inner edge, the method comprising:
    supplying at least partially molten braze material from a cap into the recess to the inner edge, wherein the at least partially molten braze material includes a first portion adjacent to the cap, and a second portion adjacent to the inner edge; and
    extracting heat from the base using a cooling device that selectively extracts heat from a location on the base, the location being closer to the inner edge of the recess than to the cap, such that heat extraction at the location is greater than heat extraction at the cap;
    wherein the second portion of the at least partially molten braze material cools in temperature faster than the first portion.

6. The method in accordance with claim 5, wherein extracting heat further comprises conductively cooling at the location using a cooling device that includes a thermal conduction element in contact with the location, the thermal conduction element being a heat exchanger.

7. The method in accordance with claim 5, wherein extracting heat further comprises using a cooling device that includes an impingement manifold that directs a fluid into impingement with the location.

8. The method in accordance with claim 5, further comprising positioning at least partially solid braze material above the recess within an environment, wherein supplying the at least partially molten braze material from the cap to the recess further comprises heating the environment to a brazing temperature to create the at least partially molten braze material.

9. The method in accordance with claim 8, wherein extracting heat further comprises cooling the at least partially molten braze material to form a solid braze joint within the recess, the method further comprising positioning a thermal insulation layer over an exposed braze surface on the cap before supplying the at least partially molten braze material and extracting heat from the base.

* * * * *